(12) United States Patent
White et al.

(10) Patent No.: US 10,012,536 B2
(45) Date of Patent: Jul. 3, 2018

(54) COMPONENT ALIGNMENT SYSTEM FOR OPTICAL SYSTEMS

(71) Applicant: OCEAN OPTICS, INC., Largo, FL (US)

(72) Inventors: Kenneth D. White, Cocoa, FL (US); Warren H. Miller, Palm Bay, FL (US); Reeder N. Ward, Melbourne, FL (US)

(73) Assignee: Ocean Optics, Inc., Largo, FL (US)

( * ) Notice: Subject to any disclaimer, the term of this patent is extended or adjusted under 35 U.S.C. 154(b) by 0 days.

(21) Appl. No.: 15/046,562

(22) Filed: Feb. 18, 2016

(65) Prior Publication Data
US 2016/0245694 A1 Aug. 25, 2016

Related U.S. Application Data

(60) Provisional application No. 62/118,039, filed on Feb. 19, 2015.

(51) Int. Cl.
*G01J 3/02* (2006.01)
*G01J 3/18* (2006.01)

(52) U.S. Cl.
CPC ........... *G01J 3/0289* (2013.01); *G01J 3/0202* (2013.01); *G01J 3/0208* (2013.01); *G01J 3/18* (2013.01)

(58) Field of Classification Search
CPC ...... G01J 3/0289; G01J 3/0202; G01J 3/0208; G01J 3/18
See application file for complete search history.

(56) References Cited

U.S. PATENT DOCUMENTS

| | | | | |
|---|---|---|---|---|
| 2,166,101 A | * | 7/1939 | Moller | B23Q 17/24 359/809 |
| 4,213,707 A | * | 7/1980 | Evans, Jr. | A24C 5/3412 356/429 |
| 4,561,776 A | | 12/1985 | Pryor | |
| 4,687,324 A | * | 8/1987 | Selbach | G01B 11/00 356/3.12 |
| 4,936,853 A | * | 6/1990 | Fabian | A61F 2/389 623/20.15 |
| 5,125,607 A | * | 6/1992 | Pryor | A61M 5/1415 248/125.1 |
| 5,137,441 A | * | 8/1992 | Fogarty | B24B 13/005 249/160 |
| 5,613,024 A | | 3/1997 | Shahid | |
| 2004/0239931 A1 | | 12/2004 | Teichmann et al. | |

* cited by examiner

*Primary Examiner* — Kara E Geisel
*Assistant Examiner* — Violeta A Prieto
(74) *Attorney, Agent, or Firm* — Dennis L. Cook, Esq.

(57) ABSTRACT

An optical system design using Morse Taper mounted optical components for improving alignment performance, and more specifically a spectrometer design wherein the components include Morse Taper male tapers and the spectrometer bench include Morse Taper female openings that eases alignment and improves alignment stability, both physical and temperature related, of optical components while simplifying manufacture and maintaining a compact footprint is disclosed.

3 Claims, 3 Drawing Sheets

Fig 3
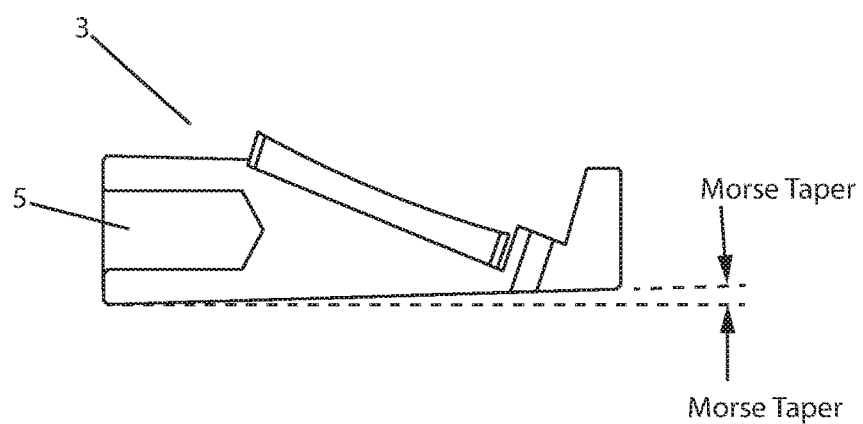
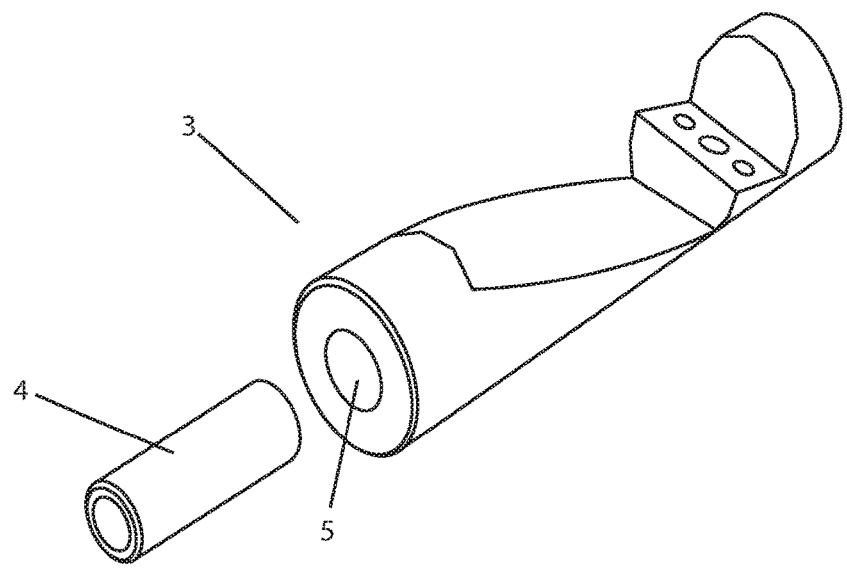

COMPONENT ALIGNMENT SYSTEM FOR OPTICAL SYSTEMS

CROSS-REFERENCE TO RELATED APPLICATION

The present application claims the benefit of previously filed Provisional Patent Application Ser. No. 62/118,039, filed on Feb. 19, 2015.

FIELD OF THE INVENTION

This invention belongs to the field of design and manufacture of optical systems. More specifically it is a spectrometer design having an improved component alignment and stability system.

BACKGROUND OF THE INVENTION

A spectrometer is a device capable of separating an input light source into its constituent spectral components and separately measuring the intensity of each such component. Spectrometers can be further classified by the nature of their dispersive element, which can be a prism or diffraction grating. In addition, if the entire dispersed spectrum is measured simultaneously by means of a photographic plate or detector array it is described as a spectrograph, and if each spectral component is presented separately to a single detector it is commonly known as a monochromator.

The following discloses the use of Morse Taper mounted optical components which, when incorporated into the design of a grating spectrograph, greatly facilitates component alignment and stability and increases ease of manufacture. An appreciation of the advantages these features represent when compared with previous designs can be derived from consideration of the following drawings and description of the invention.

BRIEF SUMMARY OF THE INVENTION

This invention is an optical system using Morse Taper mounted optical components for improving ease and stability of alignment, and more specifically is a spectrometer design to ease alignment and stability of components, simplify manufacture, and maintain a compact footprint.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 1:
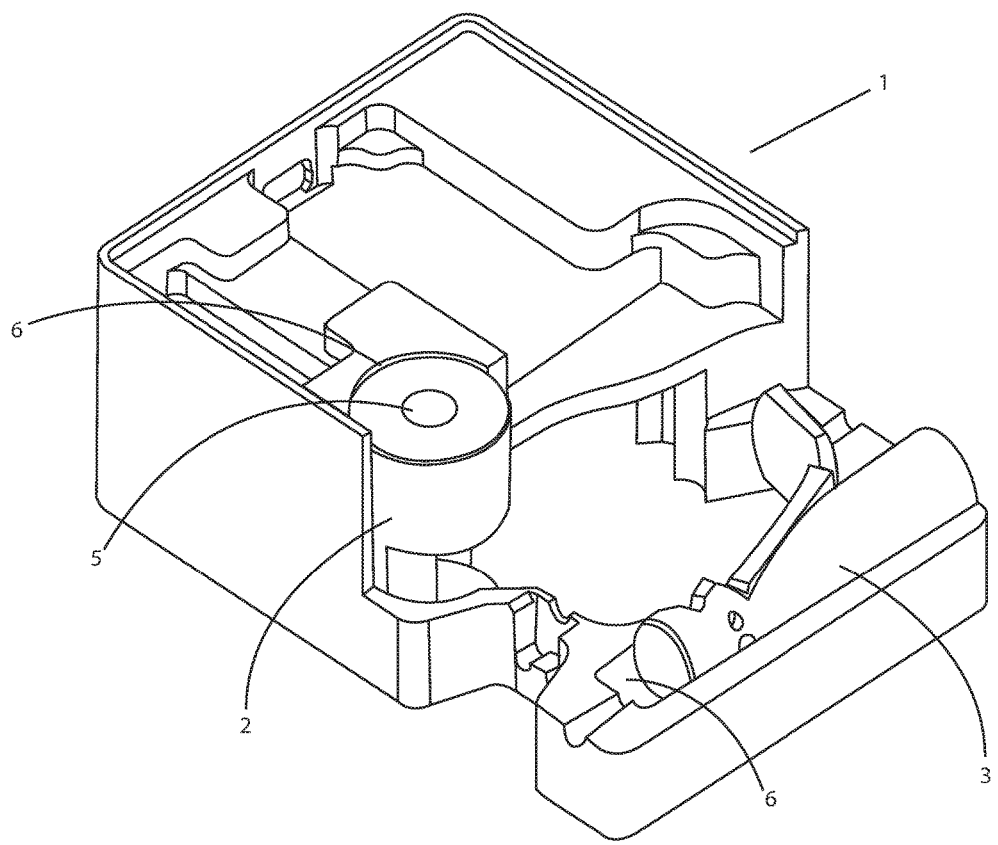
FIG. 1 shows a preferred embodiment of the improved optical component mounting and alignment system for an optical system.

What is disclosed herein is the use of Morse Taper mounted optical components for improving optical system performance and, as disclosed in the preferred embodiment, is a spectrometer design that eases alignment and improves stability of components while simplifying manufacture and maintaining a compact footprint. The sectional layout of the spectrometer design of the preferred embodiment can easily be seen in FIG. 1, which shows the spectrometer bench (1) fitted with the tapered grating mount (2) and tapered focus mirror mount pressed into the female mounting sockets (6).

Figure 2:
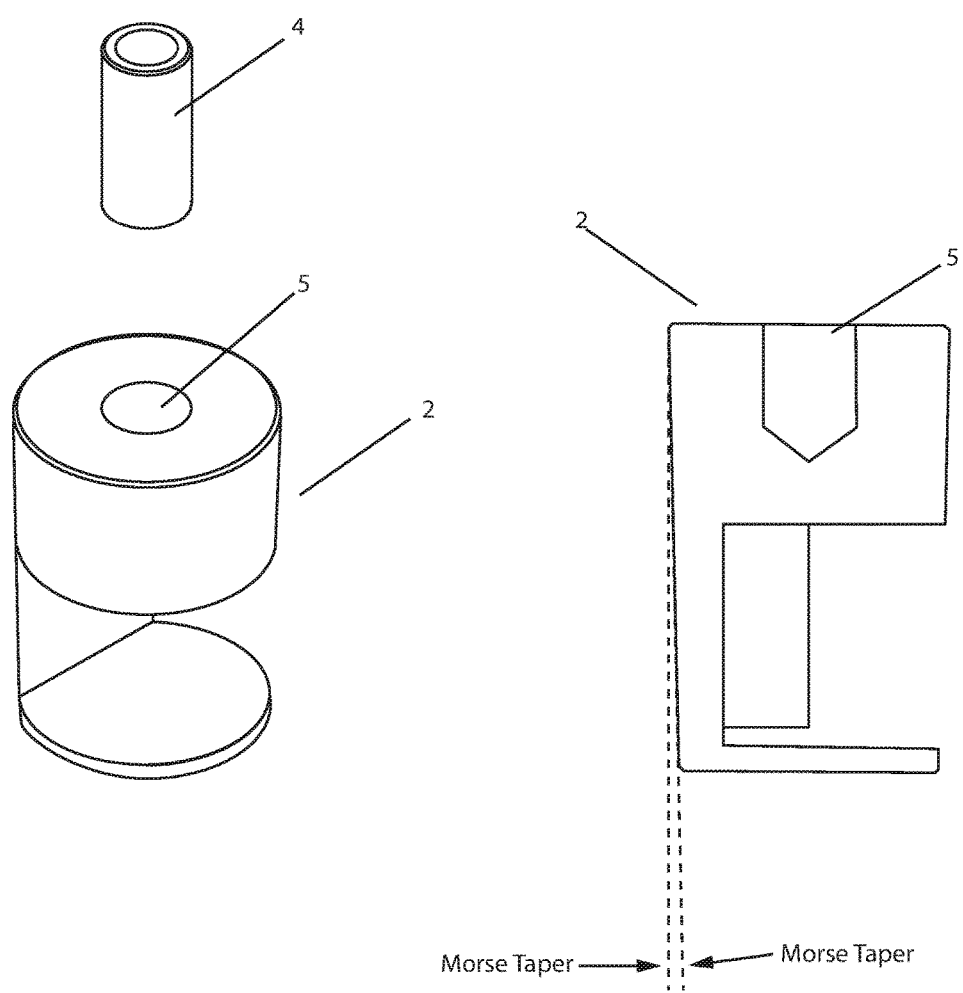
FIG. 2 show a detailed and a cut away view of the tapered grating mount on a preferred embodiment; and, FIG. 3 shows a detailed and a cut away view of the tapered focus mirror mount on a preferred embodiment.

More specifically, as shown in FIGS. 2 and 3 the spectrometer's tapered grating mount (2) and tapered focus mirror mount (3) are shaped and mounted into the female mounting sockets (6) in the spectrometer bench (1) in the manner of a Morse Taper.

This design utilizes a type of taper well known in the machining world as the Morse Taper, but which has not been used, or considered for use, in the mounting of optical components in optical systems for the purposes, or in the manner, disclosed in this application. The Morse Taper was invented by Stephen A. Morse in the mid-1860s. Since then it has evolved to encompass smaller and larger sizes and has been adopted as a standard by numerous organizations, including the International Organization for Standardization (ISO) as ISO 296 and the German Institute for Standardization (DIN) as DIN 228-1. It is one of the most widely used taper types, and is particularly common on the shank of taper-shank twist drills and machine reamers, in the spindles of industrial drill presses, and in the tailstocks of lathes. Some modular orthopedic total hip implants also use a Morse Taper to mate components together. Using standard Morse Tapers allows the use of Morse Taper reamers in the manufacturing process of spectrometers if desired.

Designing a spectrometer's, or other optical devices', optical component mounts in the form of a Morse Taper provides a dual benefit. First, the Morse Taper mount has inherent radial alignment with the spectrometer bench during adjustment, and second, the Morse Taper mount can be locked into place simply by applying a force that pushes in on the taper once the optical adjustment is complete. Great resistance to torque can be achieved by this method with a modest amount of pushing force. Another advantage to this type of mounting is alignment stability since this mounting method results in high temperature conductivity between the Morse Taper male and female surfaces decreasing alignment issues resulting from temperature variances.

The application of an adhesive as a lubricant and as an additional locking/bonding agent may also be desirable.

If used, an automated optical adjustment machine will need a way to grip the various Morse taper mounted components to manipulate them for adjustment. It is necessary that these components extend beyond the outside of the bench so that an adjustment machine has access to them. FIGS. 2 and 3 and the following discussion on pull-out pins (4) discloses a way to provide for this need to remove the pull-out pins (4) when the adjustments are complete.

Pull-out pins (4), sometimes called blind dowels, are used when a dowel is needed but the dowel pin hole can not be a through hole. Pull-out pins (4) are the same as normal dowels except that they have a tapped hole in one end. In the preferred embodiment the pins are pressed into predrilled holes (5) in the optical component Morse Taper mounts just like a normal dowel pin but instead of driving them on through the optical component Morse Taper mounts for removal they are removed by screwing a stud into the tapped hole and then drawing them out with an appropriate tool and a hex nut.

Since certain changes may be made in the above described optical system and spectrometer design features without departing from the scope of the invention herein involved, it is intended that all matter contained in the description thereof or shown in the accompanying figures shall be interpreted as illustrative and not in a limiting sense.

What is claimed is:

1. An optical component mounting and alignment system used to mount one or more optical components into an optical device comprising:
    each of said one or more optical components affixed to each of one or more Morse Taper male mounting shanks;
    said optical device having one or more Morse Taper female mounting sockets shaped to allow insertion of said one of one or more Morse Taper male mounting shanks affixed to said one or more optical components; and,
    wherein each of said one or more optical components' Morse Taper male mounting shanks affixed to each of said one or more optical components is inserted into each of said optical device's one or more Morse Taper female mounting sockets then pushed in and turned until each of said one or more optical components is securely mounted and aligned with each of said one or more other optical components in said optical device.

2. The optical component mounting and alignment system of claim 1 wherein each of said one or more optical components has an alignment hole located on an end of each of said one or more optical components away from each of said one or more affixed Morse Taper male mounting shanks and wherein each of said one or more optical components is mounted and aligned into each of said one or more Morse Taper female mounting sockets in said optical device by use of a removable pull-out pin inserted in said alignment hole.

3. The optical component and alignment system of claim 2 wherein said removable pull-out pin extends through an exterior side to outside of said optical device for use in mounting and alignment and is then removed after each of said one or more optical components is mounted and aligned.

* * * * *